United States Patent [19]

Ryan et al.

[11] 4,023,424

[45] May 17, 1977

[54] INBOARD DERAILLEUR FOR MULTISPEED BICYCLES

[76] Inventors: John W. Ryan, 674 Nimes Road, Los Angeles, Calif. 90024; James D. Moore, 6810 Locklenna Lane, Palos Verdes, Calif. 90274

[22] Filed: Nov. 10, 1975

[21] Appl. No.: 630,152

[52] U.S. Cl. ............................ 74/217 B; 280/238; 280/261
[51] Int. Cl.² .................... F16H 9/00; F16H 11/00; B62M 9/00; B62M 1/02
[58] Field of Search ............... 74/217 B, 242.15 B, 74/503, 567; 280/238, 261, 281 R, 210, 236

[56] References Cited

UNITED STATES PATENTS 3,803,933 4/1974 Huret et al. ...................... 74/217 B

FOREIGN PATENTS OR APPLICATIONS 888,511 1/1962 United Kingdom .............. 74/217 B
931,849 7/1963 United Kingdom .............. 74/217 B Primary Examiner—Leonard H. Gerin
Attorney, Agent, or Firm—Edward C. Walsh

[57] ABSTRACT

The derailleur is mounted inboard as respects the bicycle frame. It is aligned with the rear drive sprockets. The take-up cage carrying sprocket wheels over which the slack part of the chain passes is carried on an actuating rod or stem, which engages a positioning means which provides for positive transfer of the chain from one drive sprocket to another, and for positive alignment of the take-up means and drive chain with individual drive sprockets. The positioning means is in the form of overlying plates, having overlying slots configurated to positively guide the stem carrying the take-up cage to assure the positive transfer of the drive chain, and positive alignment with individual drive sprockets.

10 Claims, 7 Drawing Figures

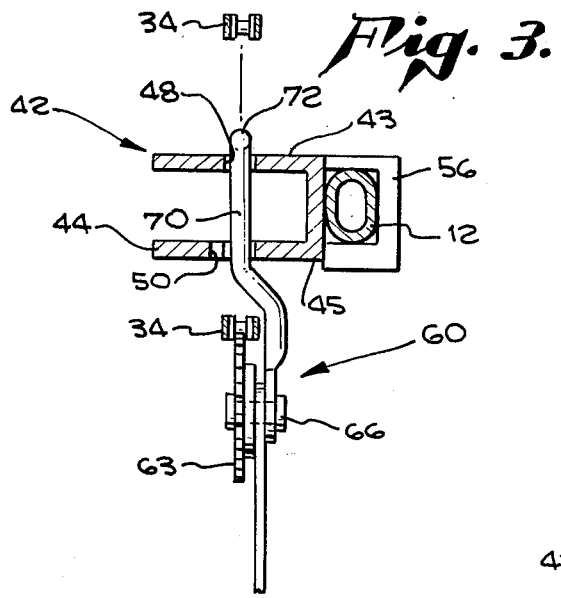
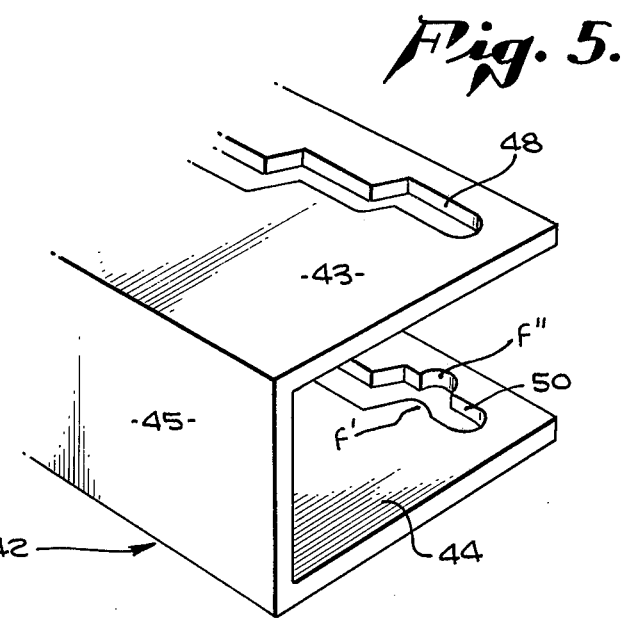
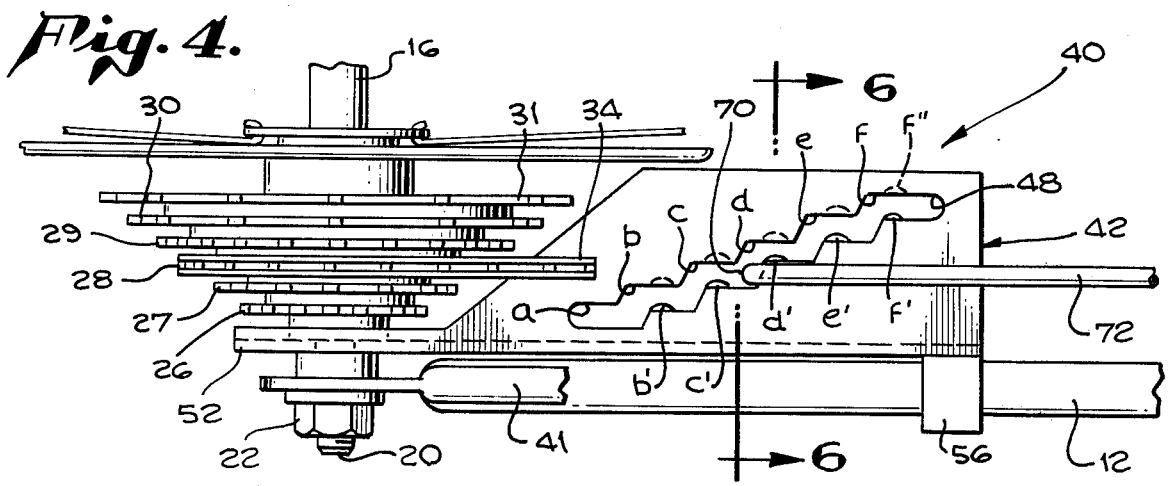
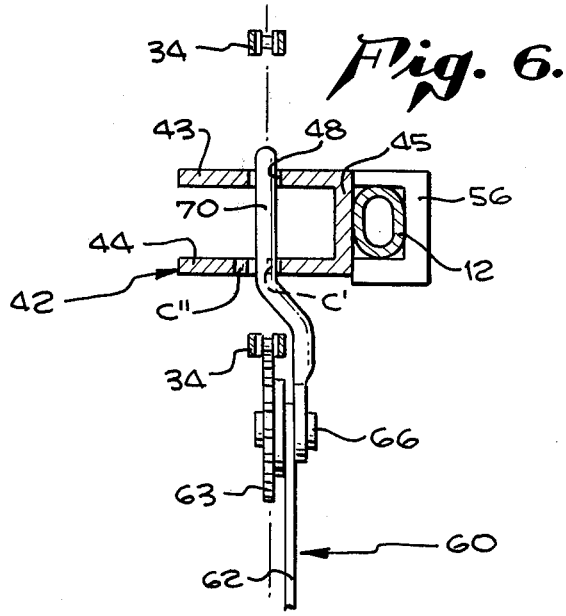
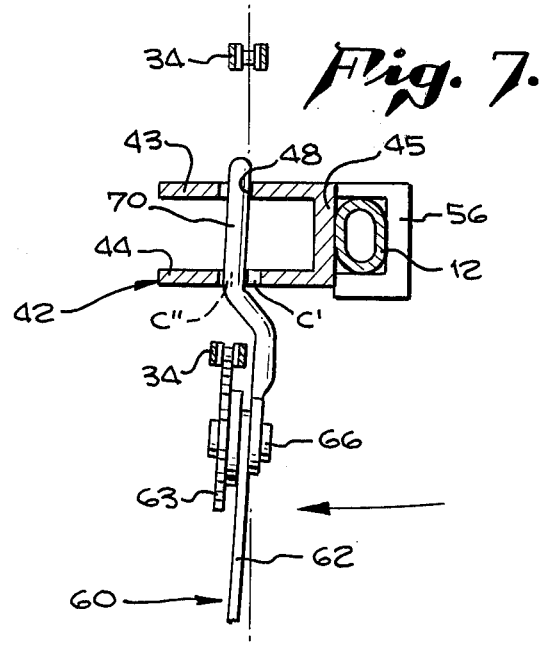

INBOARD DERAILLEUR FOR MULTISPEED BICYCLES

SUMMARY OF THE INVENTION

1. Field of the Invention

The field of the invention is that of derailleurs for multispeed bicycles. The general nature of the invention is identified in the abstract.

2. Description of the Prior Art

Derailleurs and derailleur systems as such for multispeed bicycles are known in the art. Typically known and existing derailleur systems are attached to the bicycle externally of the frame. Derailleur systems ordinarily have a transfer or take-up cage, usually consisting of a pair of sprocket wheels carried on an arm, and over which the drive chain passes. A torsion spring is mounted so as to rotate the take-up cage in a direction to normally take up the slack in the drive chain as it is transferred from one drive sprocket to another. Typically in known derailleurs, the cage is moved in a direction parallel to the rear axle, transferring the drive chain from one sprocket to another. Typically, the cage is moveable to any position within the extremes or limits of the axial spacing of the sprockets. Conventionally, the end limits of this movement are determined by adjustment screws, there being no provision for positive positioning or alignment of the cage in intermediate positions aligned with the individual drive sprocket. Thus, the prior art systems are subject to a number of deficiencies and disadvantages. Firstly, the attachment of the derailleur externally of the frame makes it vulnerable to being hit or damaged and having its adjustment disturbed. The known systems are further subject to criticality of installation adjustments. They require regular maintenance adjustments. They are vulnerable to being struck and bent. There is no positive positioning or locating of the transfer and take-up cage, nor positive alignment with the drive sprockets. There is no provision for uniformity of the successive step movements from one drive sprocket to another.

The herein invention seeks to overcome all of the drawbacks and disadvantages of the prior art and at the same time to provide a number of unique improvements and advantages.

The derailleur of the invention provides a bracket means with which the transfer and take-up cage is associated in a manner to provide positive and unambiguous step movements of the transfer cage between drive positions and to provide positive positioning and alignment of the transfer and take-up cage with individual drive sprockets. The derailleur itself, including the improved guide means, is mounted inboard with respect to the bicycle frame, rather than on the outside of it.

The primary object of the invention is to provide a derailleur that eliminates all of the deficiencies and disadvantages of prior known derailleurs, as set forth in the foregoing.

A further object is to provide a derailleur embodying the characteristics that the transfer and take-up cage is moved positively in uniform, guided steps from one position to another and provides positive alignment of the transfer cage and drive chain with individual drive sprockets.

A further object is to eliminate the need of critical installation adjustments and maintenance adjustments.

A further object is to provide a derailleur which is in a position to be protected against damage by being inboard as respects the frame.

A further object is to realize in the derailleur the characteristics that in the transfer from one sprocket to another the transfer and take-up cage is moved slightly beyond the next position to insure proper and adequate shift of the slack part of the drive chain to the next sprocket.

Further objects and additional advantages of the invention will become apparent from the following detailed description and annexed drawings.

BRIEF DESCRIPTION OF THE DRAWINGS

FIG. 3 is a sectional view taken along the line 3—3 of FIG. 2;

FIG. 4 is a view similar to that of FIG. 1;

FIG. 5 is a detail perspective view of a part of the derailleur;

FIG. 6 is a sectional view taken along the line 6—6 of FIG. 4;

FIG. 7 is a view similar to FIG. 6 showing the mechanism in a slightly different position.

DESCRIPTION OF THE PREFERRED EMBODIMENT

Figure 1:
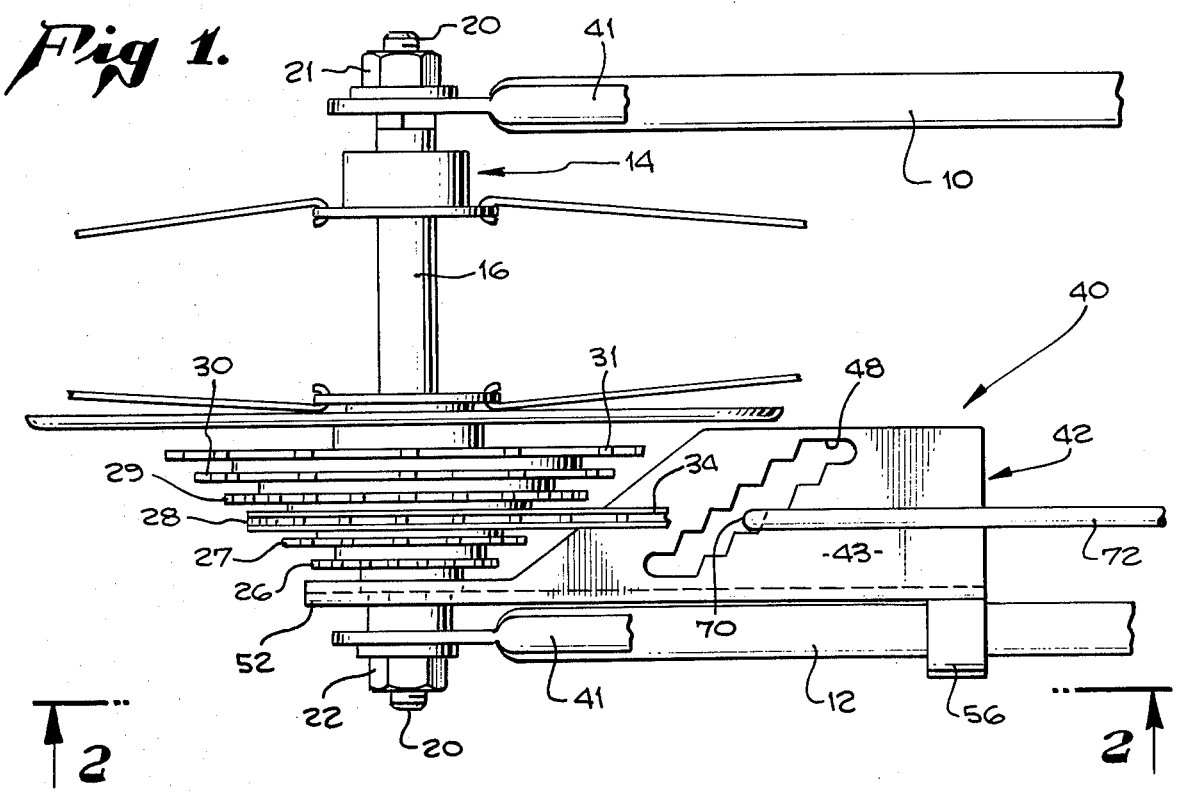
FIG. 1 is a diagrammatic plan view of the rear part of a bicycle frame and wheel, showing the derailleur of the invention in installed position.

The numerals 10 and 12 designate bicycle frame members which support a rear wheel, the wheel being designated by the numeral 14. The wheel has a hub 16, and as diagrammatically shown is mounted on a bolt 20, there being nuts 21 and 22 on the ends of the bolt which extend through the ends of the frame members 10 and 12.

In the form of the invention shown, the rear wheel has six drive sprockets progressively larger in size as designated at 26, 27, 28, 29, 30 and 31. There is only one crank sprocket in the set-up of the invention. Using these six sprockets the full gear range of a normal 10-speed system is available. The sprocket may have a number of teeth as follows: 12, 14, 17, 21, 26 and 36. With a 48-tooth crank sprocket there is provided a 3:1 ratio from 36 to 108, in six progressive steps. A six-gear (sprocket) system has less chain offset than a 10-speed system; it has no dual shifting; it has positive gear locations; it requires no adjustment; it is comparatively theft-proof and is maintenance free. It has fewer parts and is more economical and is easier to use than a typical 10-speed system. This should provide a significant reason to augment the number of novice riders.

The drive chain is designated as 34, and the derailleur itself is designated generally by the numeral 40. FIG. 2 shows an additional frame member 41. The derailleur embodies a U-shaped bracket member as designated at 42, having extending overlying legs or plate members 43 and 44. The plate members 43 and 44 have slots or channels in them as designated at 48 and 50, as will be referred to again presently. The overlying plates of the bracket 42 have configuration as may be seen in FIGS. 1 and 4. The base member 45 of the bracket 42 has a rearwardly extending portion 52 which is mounted on the rear axle 20 of the bicycle. The forward end of the derailleur 40 is secured to the frame member 12 by means of a U-shaped bracket 56, which embraces the frame member.

As may be seen from the foregoing, the plates 43 and 44 are in a horizontal position and are aligned with the drive sprockets 26–31.

The transfer and take-up cage is designated generally by the numeral 60 in FIG. 2. It includes a support member 62 which carries shafts or arbors for small sprocket wheels 63 and 64 over which the slack side of the chain passes. The transfer and take-up cage is conventional and is utilized for purposes of taking up the slack in the chain and for transferring it from one drive sprocket to another. The shaft or arbor of the sprocket 63 is designated by the numeral 66. The take-up cage means includes a torsion spring mounted to rotate the support member 62 of the cage so as to automatically take up the slack. This particular structure is conventional and is therefore not shown in detail.

The transfer and take-up cage 60 is carried on a stem 70 which has a vertical part that passes through the slots 48 and 50 in the bracket 42 and which has a horizontal rod or stem part 72 which extends forwardly and which is the actuator means by which the derailleur is shifted from one gear ration to another.

Figure 2:
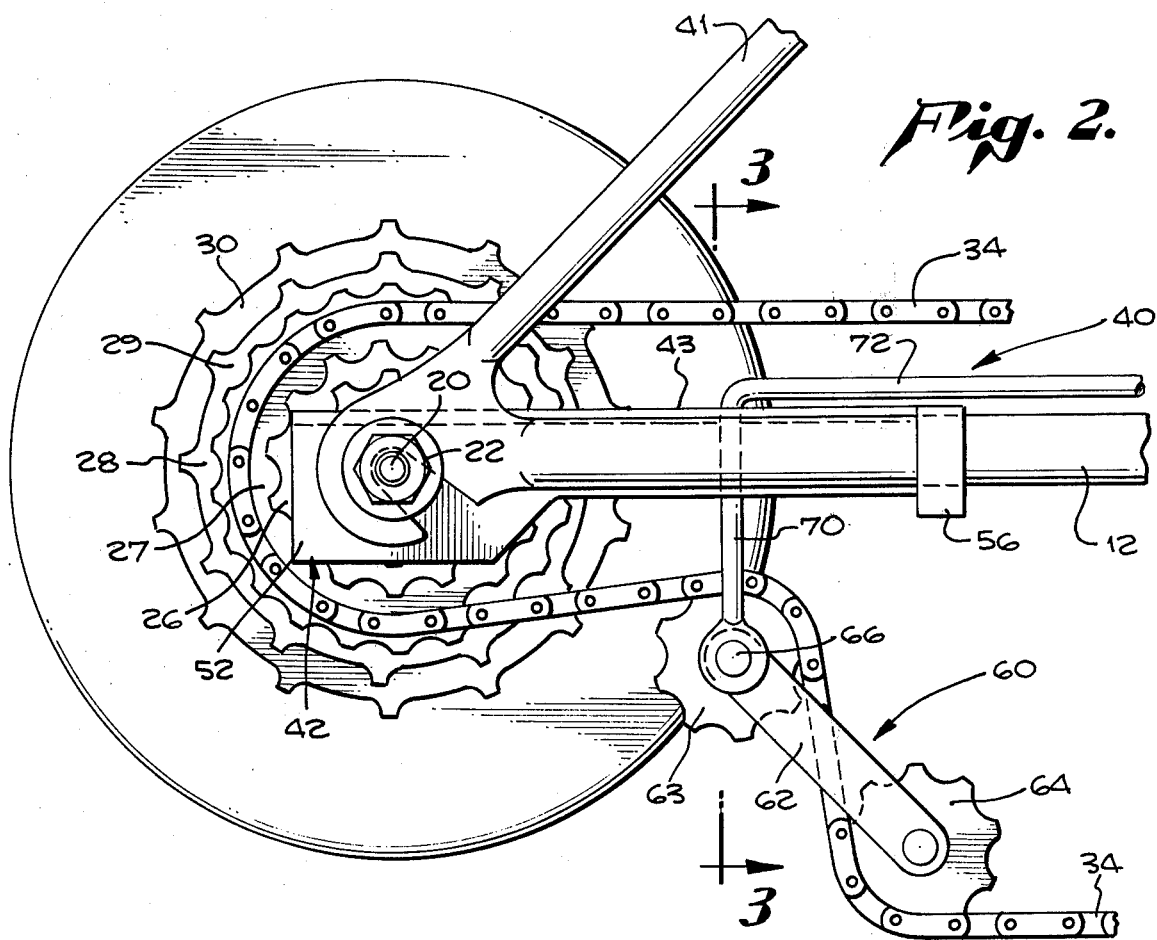
FIG. 2 is an elevational view of the structure of FIG. 1.

The configuration of the slots 48 and 50 can best be seen in FIGS. 1, 4 and 5. The slot 48 has a plurality of straight portions offset from each other as designated at $a$, $b$, $c$, $d$, $e$ and $f$, each of these straight portions being aligned with one of the drive sprockets 26–31. The slot 50 is of similar shape and configuration, having straight portions offset from each other that are vertically aligned with the straight portions $a$, $b$, $c$, $d$, $e$ and $f$ of the slot 48. The slot 50, however, has bosses or protrusions $a'$, $b'$, $c'$, $d'$, $e'$ and $f'$ and has arcuate recesses opposite the protrusions, one of which is designated at $f''$ in FIG. 5, these recesses being in the side of their respective slots which is opposite to the protrusions. The recesses are all like the one shown at $f''$.

FIG. 3 shows a normal position of the transfer and take-up cage 60 with the upper and lower reaches of the chain 34 vertically aligned and aligned with a drive sprocket.

In operation or use of the derailleur the shifting of the gear ratios is done by shifting the rod or stem 72 in a fore and aft direction. This causes the vertical part 70 of the stem that carries the transfer and take-up cage to traverse the slots 48 and 50 as illustrated in the figures. As the stem part 70 traverses the slot the transfer and take-up cage 60 carrying the slack part of the chain is moved laterally, transferring the chain from one drive sprocket to another and establishing positive drive positions determined by the straight positions of the overlying slots as identified by the characters $a$, $b$, $c$, $d$, $e$, and $f$. The exact location of 70 to align with sprockets 26–31 is eliminated by these slots $a$, $b$, $c$, $d$, $e$ and $f$.

FIGS. 6 and 7 illustrate the movement of the take-up cage 60 during transfer; that is, movement from one drive position to another; in other words, movement from one straight position of the overlying slots to the next straight position aligned with a drive sprocket. As may be seen in FIGS. 6 and 7, when the stem portion 70 moves from one set of overlying straight slot parts to the next, the stem part 70 has to override a protrusion such as protrusion $c'$, and then the part of the stem 70 that extends through the slot 50 is able to move into one of the recesses such as the recess $c''$ as seen in FIGS. 6 and 7. This imparts slight additional lateral movement and tilt of the transfer and take-up cage 60 during the course of its movement, beyond the position of alignment with the next drive sprocket so as to insure that the slack part of the chain properly engages on the teeth of the next drive sprocket. In the final position of the take-up cage, it is directly aligned with the next drive sprocket as illustrated in FIG. 3.

The invention is applicable to 10-speed or other multiple speed system as well.

From the foregoing, those skilled in the art will readily understand the nature and construction of the invention and the manner in which it achieves and realizes all of the objectives and advantages as set forth in the foregoing.

The foregoing disclosure is representative of a preferred form of the invention and is to be interpreted in an illustrative rather than a limiting sense, the invention to be accorded the full scope of the claims appended hereto.

We claim:

1. In a derailleur for a multispeed bicycle, having a plurality of rear sprockets and a drive chain, the improvement comprising mechanism for changing speeds by shifting the drive chain from one rear sprocket to another, said mechanism comprising a moveable transfer cage having sprocket means over which the chain passes, said mechanism being mounted inboard of the bicycle frame and having means for transferring the drive chain from one drive sprocket to another.

2. The derailleur, as in claim 1, said mechanism including guide means aligned with the drive sprockets, said transfer cage means having interengagement with the guide means, and the said guide means being constructed to provide for movement of the transfer cage means to positions positively aligning the transfer means with individual drive sprockets.

3. The derailleur, as in claim 2, wherein said guide means comprises a member having slot means, a stem carrying said transfer cage means engaged in the slot means, the slot means having a configuration whereby the stem is moveable progressively between positions of positive alignment of the transfer cage means with individual drive sprockets.

4. A derailleur, as in claim 3, wherein said guide means comprises spaced members having slots in them, the slots overlying each other.

5. A derailleur, as in claim 3, wherein the slots in the guide means are configurated, whereby upon the stem moving from one aligned position to another the transfer cage means is caused to move slightly beyond the position of alignment with the next drive sprocket in order to assure transfer of the slack side of the drive chain to the next sprocket.

6. A derailleur, as in claim 5, wherein said overlying slots in the guide means are relatively configurated whereby when said stem moves from one position of alignment to another, the stem is tilted so as to move the transfer means slightly beyond the next position of alignment with the drive sprocket.

7. A derailleur, as in claim 5, wherein the overlying slot means includes formations in the respective slots engageable with the said stem so as to tilt the stem.

8. A derailleur as in claim 4, wherein the guide means is in the form of a U-shaped bracket, said members being legs of the bracket.

9. In the derailleur for a multispeed bicycle, having a plurality of rear sprockets and a drive chain, and mechanism for changing speeds by shifting the drive chain from one sprocket to another, the improvement including said mechanism having a movable transfer cage having sprocket means over which the chain passes, said transfer cage being mounted in a position between a bicycle wheel and a bicycle frame member, the transfer cage being movable for transferring the drive chain from one drive sprocket to another.

10. A derailleur as in claim 9, including means whereby the transfer cage is moved in predetermined steps and is held in predetermined positions aligned with individual drive sprockets.

* * * * *